Nov. 24, 1925.
C. S. CRAWFORD
1,562,439
ARTIFICIAL BAIT
Original Filed Nov. 24, 1923
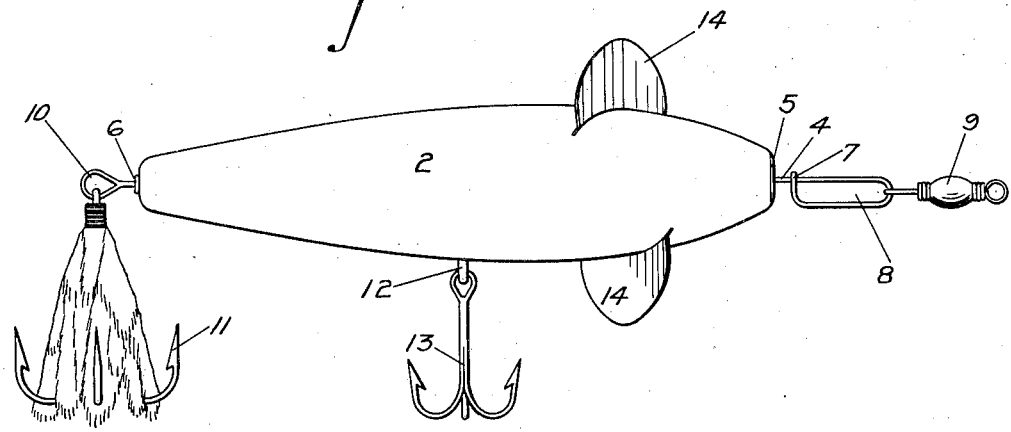
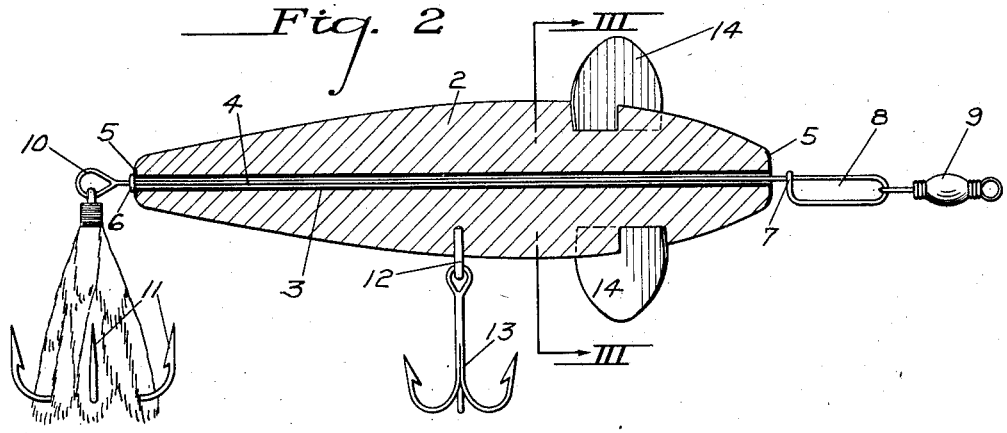
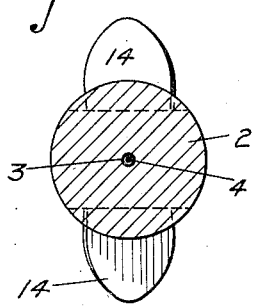
Charles S. Crawford INVENTOR.
BY C. M. Clarke ATTORNEY.

Patented Nov. 24, 1925.

1,562,439

UNITED STATES PATENT OFFICE.

CHARLES S. CRAWFORD, OF PITTSBURGH, PENNSYLVANIA.

ARTIFICIAL BAIT.

Original application filed November 24, 1923, Serial No. 676,763. Divided and this application filed July 7, 1925. Serial No. 41,967.

*To all whom it may concern:*

Be it known that I, CHARLES S. CRAWFORD, a citizen of the United States, residing at Pittsburgh, in the county of Allegheny and State of Pennsylvania, have invented certain new and useful Improvements in Artificial Bait, of which the following is a specification.

My invention consists of an improvement in artificial baits for casting or trolling. It has for its object to provide in such a bait, a fish or cigar-shaped body, freely rotatable on a central stem, and provided with one or more freely connected hooks or groups of hooks. The present invention relates particularly to means for mounting the body on its stem, providing for free rotation, a terminal hook or hooks, and spinning wings or vanes for the body, with other features of improvement as hereinafter described.

This application is a division of my copending application. filed November 24, 1923, Serial No. 676,763.

In the drawings showing one preferred embodiment of the invention:

Fig. 1 is a view of the device in side elevation;

Fig. 2 is a longitudinal vertical sectional view;

Fig. 3 is an enlarged cross section on the line III—III of Fig. 2.

The main body portion 2 of the bait is made of wood or other suitable light material, and is generally circular or oval in cross section to simulate the body of a fish, tapering towards each end as shown. Extending centrally of the body 2 from front to back is a tubular lining or bearing shell 3 for the reception of the central stem or snood 4, constituting the main tension member of the device.

Tube 3 is preferably turned over and outwardly flanged around each end of the body as at 5, 5, to form a closely contacting water tight joint with the tapered terminals of the body, and to provide end bearings for washers or rings 6, 7 of the central stem 4. Said stem is just sufficiently smaller than the inner diameter of tube 3 to allow for free rotation of the tube and body around it, with slight clearance. The stem is proivded at its front end with an elongated eye 8 for connection with the usual line by swivel joint 9, and at the rear end with a terminal eye 10 for attachment of the freely movable terminal hook or hooks 11.

Loosely attached to the body 2 at or about its middle by an eye 12, or in any suitable way, is the freely swinging hook or gang of hooks 13. These are so arranged that they will be whirled around by rotation of the body, and will be thrown out by centrifugal force and will stand outwardly more or less, free to catch when the bait is struck. If desired, two such gangs of hooks may be similarly connected at opposite sides, or any desired number at such varying positions, annularly and longitudinally of the body 2.

For the purpose of effecting rotation of the body on its stem 4, it is provided with a pair of oppositely located diagonally arranged vanes, fins, or wings 14. These may be of thin light metal, as aluminum, copper, etc., inserted and secured in receiving slots in the wooden body, or otherwise, as preferred. These wings are set in the forward part of the device and as it is drawn through the water, cause the body to spin rapidly and throw the hooks 13 outwardly, as described.

At the same time, the body will assume an approximately horizontal position, tending to lift the rear hooks 11, and causing them to wobble. In this manner, I provide a combined spinner and wobbler, closely imitating a swimming fish.

It will be understood also that the body of the bait may be painted or coated in any desired mamnner or color, for protection and simulation of a natural fish.

The advantage of the construction is principally due to the free rotation of the body on its central stem, the tight end connections between the body and the central tubular housing with resulting free rotation of the body, and centrifugal freely swinging action of the body hooks.

These, by rapid free action and scope of movement, tend to reach quite beyond the bait proper and to catch a striking fish independently of and beyond the reach of the rear terminal hooks 11.

The device may be made in any suitable size or may be changed in proportions or other details by the skilled mechanic within the scope of the appended claims.

What I claim is:

1. In combination with a central stem having a front attaching eye and a rear loosely connected hook, a fish-shaped body provided with a central tube having terminal flanges tightly secured against the body at each end for rotatable mounting on the central stem, and provided with a freely swinging hook loosely mounted at one side of the body.

2. In combination with a central stem having a front attaching eye and a rear loosely connected hook, a fish-shaped body provided with a central tube having terminal flanges tightly secured against the body at each end for rotatable mounting on the central stem, abutting washers on the stem adapted to bear against each end of said tube, and a freely swinging hook loosely mounted at one side of and beyond the surface of the body.

In testimony whereof I hereunto affix my signature.

CHARLES S. CRAWFORD.